US010628450B1

(12) United States Patent
Keskar

(10) Patent No.: US 10,628,450 B1
(45) Date of Patent: Apr. 21, 2020

(54) SYSTEM AND METHOD FOR BLOCKCHAIN-BASED SECURE DATA PROCESSING

(71) Applicant: Innoplexus AG, Eschborn (DE)

(72) Inventor: Abhijit Keskar, Pune (IN)

(73) Assignee: Innoplexus AG, Eschborn (DE)

( * ) Notice: Subject to any disclaimer, the term of this patent is extended or adjusted under 35 U.S.C. 154(b) by 0 days.

(21) Appl. No.: 16/526,175

(22) Filed: Jul. 30, 2019

Related U.S. Application Data

(60) Provisional application No. 62/739,273, filed on Sep. 30, 2018.

(51) Int. Cl.
*G06F 16/27* (2019.01)
*G06F 16/13* (2019.01)
*H04L 9/06* (2006.01)

(52) U.S. Cl.
CPC ............ *G06F 16/27* (2019.01); *G06F 16/134* (2019.01); *H04L 9/0637* (2013.01); *H04L 9/0643* (2013.01); *H04L 2209/38* (2013.01)

(58) Field of Classification Search
CPC .............................. G06F 16/27; G06F 16/134
USPC .......................................................... 707/736
See application file for complete search history.

(56) References Cited

U.S. PATENT DOCUMENTS

| | | | |
|---|---|---|---|
| 2018/0007131 A1* | 1/2018 | Cohn | H04L 67/1068 |
| 2018/0285979 A1* | 10/2018 | Chessell | G06Q 40/08 |
| 2019/0050854 A1* | 2/2019 | Yang | G06Q 20/382 |
| 2019/0102850 A1* | 4/2019 | Wheeler | G06Q 50/188 |
| 2019/0114182 A1* | 4/2019 | Chalakudi | H04L 9/3297 |

* cited by examiner

*Primary Examiner* — Joshua Bullock
(74) *Attorney, Agent, or Firm* — Ziegler IP Law Group, LLC

(57) ABSTRACT

Disclosed herein is a system and method for secure remote data processing between two or more entities over a blockchain. The invention provides for processing of data records within a data structure repository of a smart contract hosted on a blockchain, thereby eliminating the need to transfer the data records to one another, by the entities. The processing is secure and the data records are deleted once the processing is complete.

20 Claims, 5 Drawing Sheets

SYSTEM AND METHOD FOR BLOCKCHAIN-BASED SECURE DATA PROCESSING

CROSS REFERENCE TO RELATED APPLICATIONS

This application claims priority to U.S. Provisional Patent Application No. 62/739,273 filed Sep. 30, 2018, which is hereby incorporated by reference in its entirety.

TECHNICAL FIELD

The present application relates generally to the field of data processing and particularly to data processing with a blockchain acting as a data processing intermediary. Further, the present invention relates to remote data processing in a secured manner.

BACKGROUND

Recently, more and more businesses are using blockchain to decentralize their applications (to make it intermediary free) and as a result more transaction data is being added to the blockchain. A large amount of data is useless unless the same is processed to generate useful information and/or insights from the humongous data points. However, it has been observed that in general course of business there are different entities controlling the source of data, the data processing algorithms. There are several cases where an entity that requires certain information/insights which can be derived by processing, using an algorithm, certain data records. This calls for data transfer between one or more entities viz-a-viz an entity holding the data records, another data entity with the algorithm for data processing. More often than not, entities are hesitant to share the data owing to threats of data theft, data privacy breach and cyber phishing attacks, thereby unbale to process the desired data to unearth useful information and knowledge remains confined in silos across entities. Further, in many situation, people are afraid to enter into such data processing arrangements given the confidential nature of data records that are to be processed.

Traditionally, entities transfer their data to one another in order to process the data to generate insights/information. Alternatively, they purchase the data records and the associated data processing algorithm and then process the data records within their secured environment.

Transferring data to another party is always subject to issues of theft, cyberattack, misappropriation by the other party or some third party which might get pass through the applied security measures. Moreover, purchasing the data records might not be practical as well as feasible for many entities owing to cost of data records as well as the storage space requirements.

In light of the above-mentioned shortcomings associated with existing methods and systems for processing data records between two or more entities, it is highly desirable to have a system and method that allows data records to be remotely processed on a blockchain communicatively coupled to a data requester and a data provider.

The present invention, as described below, allows data records from a data provider to be remotely processed, using one or more data processing algorithms, on a blockchain and transmitted to a data requester, thereby eliminating concerns with respect to data security, breach and need for storing third-party data.

SUMMARY

Embodiments of the present disclosure present technological improvements as solutions to one or more of the above-mentioned technical problems recognized by the inventor(s) in conventional systems.

In an aspect of the present invention, a system and method of data processing on a blockchain is provided.

In another aspect of the present invention, a system and method for remote data processing, using data records from a data provider, on a blockchain is provided.

In another aspect of the present invention, a system and method for transmitting, to a data requester, an output of data processing on a blockchain is provided.

In another aspect of the invention, one or more data records stored on a distributed file system are processed on a blockchain using one or more data processing algorithms. Beneficially, the present invention provides a computer implemented method for secure data processing on a blockchain communicatively coupled to a data requester and a data provider, the method comprising:

receiving, from the data requester, at least one requester transaction with one or more preconfigured permissions wherein the requester transaction comprises a method name, and one or more parameters;

determining an availability of a first set of data record on the blockchain;

deferring, based on a determination of unavailability of the first set of data record on the blockchain, an execution of the requester transaction;

receiving, from a data provider, at least one provider transaction on the blockchain wherein the provider transaction comprises information pertaining to the first set of data records;

resuming, subsequent to execution of the provider transaction, the execution of the requester transaction;

implementing a data processing method, corresponding to the method name, on the first set of data records;

transmitting an output to the data requester wherein the output is derived out of the implementation of the data processing method on the first set of data records.

In another aspect, the present invention provides a secure data processing system comprising:

a data requester;

a data provider;

a blockchain communicatively coupled to the data requester and the data provider, wherein the blockchain is configured to:

receive, from the data requester, at least one requester transaction with one or more preconfigured permissions wherein the requester transaction comprises a method name, and one or more parameters;

determine an availability of a first set of data record on the blockchain;

defer, based on a determination of unavailability of the first set of data record on the blockchain, an execution of the requester transaction;

receive, from a data provider, at least one provider transaction on the blockchain wherein the provider transaction comprises information pertaining to the first set of data records;

resume, subsequent to execution of the provider transaction within a predetermined time, the execution of the requester transaction; implement a data processing method, corresponding to the method name, on the first set of data records;

transmit an output to the data requester wherein the output is derived out of the implementation of the data processing method on the first set of data records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the below-mentioned detailed description and drawings.

OBJECT OF INVENTION

An object of the invention is to provide a method for data processing, on a blockchain, between a data requester and a data provider.

Another object of the invention is to provide a secure means for implementing data processing for data records wherein the data records are not transferred to an external entity for processing, thereby ensuring confidentiality, security and integrity of the data records.

Another object of the invention is to allow data processing, on a blockchain, of data records wherein the data records are stored in structured manner.

BRIEF DESCRIPTION OF DRAWINGS

The summary above, as well as the following detailed description of illustrative embodiments are better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
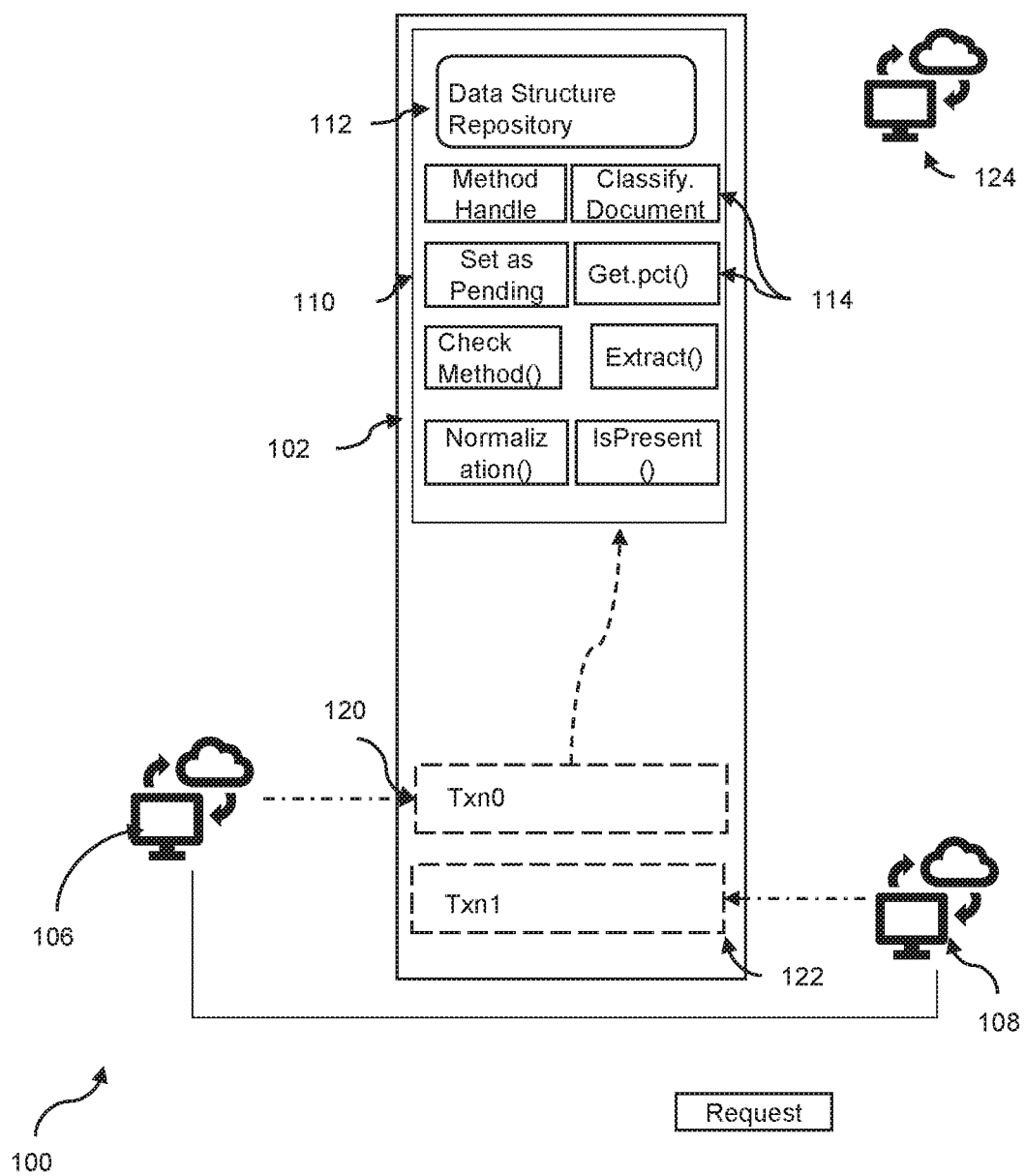
FIG. 1 is a block diagram of the system for secure data processing between a data requester and a data provider using blockchain according to an exemplary embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

It will be appreciated that the drawings illustrated herein are for representative purposes only and do not intend to limit the scope of the present disclosure, and actual implementation of the present disclosure may be viewed substantially differently.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data. Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Additional modules can be included without deviating from the novel art of this disclosure. In addition, each module can include any number and combination of sub-modules, and systems, implemented with any combination of hardware and/or software modules.

Method steps of the invention may be performed by one or more computer processors executing a program tangibly embodied on a computer-readable medium to perform functions of the invention by operating on input and generating output. Suitable processors include, by way of example, both general and special purpose microprocessors. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer executable instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer executable instructions for carrying out a plurality of operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages. The computer readable program instructions may execute entirely on the user's computer, partly on the user's computer, as a stand-alone software package, partly on the user's computer and partly on a remote computer or entirely on the remote computer or server. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The present invention claims a system and method of secured and remote data processing of data records between two or more entities without the need of transferring data records to one another. The present invention discloses use a blockchain for data processing through one or more data processing algorithms stored within a data structure of a smart contract on the blockchain. Throughout this disclosure, the term "data records" refers to information stored in a plurality of blocks of the blockchain and includes financial data, sales data, medical data, etc. Such information is added to the said plurality of blocks by means of one or more transactions appended to the blockchain. The term "user interface" refers to a graphical user interface unit or a command line interface which enables a user to access information stored on the blockchain and/or to store information on the blockchain. Further, the user interface is configured to receive one or more inputs from a user.

Figure 2:
FIG. 2 depicts a status index as per the exemplary embodiment.

FIG. 1. depicts an exemplary system, per the present disclosure, wherein the system 100 comprises a blockchain 102 communicably coupled to at least one data requester 106 and at least one data provider 108. The blockchain can be a public blockchain or a private blockchain. Optionally, the blockchain could be permission-less or permissioned. The blockchain is configured to include an initial smart contract 110 wherein the initial smart contract comprises a data structure repository 112. The initial smart contract further comprises one or more data processing methods 114, and one or more standard methods with pre-configured permissions. Each of the data processing methods is a smart contract method that, when invoked, implements at least one data processing algorithm on one or more data records within the data structure repository 112 of the initial smart contract 110. In an embodiment, the blockchain 102 is communicably coupled to one or more data processors, wherein the one or more data processors 124 are configured to add one more data processing methods, in form of smart contract methods, on the initial smart contract 110 wherein each of the data processing method is operable to implement at least one data processing algorithm. Non-limiting example of such data processing algorithms are entity extraction, network analysis etc. Preferably, the blockchain keeps updating the data processing methods 114 by interacting with the one or more data processors, while not in operation. Optionally, the blockchain 102 may communicate, while in operation, with the one or more data processors, on the fly, to add a data processing method within the initial smart contract 110. Optionally, the one or more data processing methods may be accessed from another blockchain communicably coupled to the blockchain 102. Reference cited to patent application number U.S. Ser. No. 16/229,059 wherein the application describes how a blockchain may execute smart contract methods from a smart contract on another blockchain. The said application has been incorporated by reference in its entirety to enable the use of data processing methods on another blockchain in one of the embodiments of the present invention. The blockchain 102 is further operable to maintain a list of available data processing methods and their corresponding arguments through Application Binary Interface (ABI). Further, the initial smart contract 110 comprises a status index 118 of one or more transactions added to the blockchain 102 wherein each of the one or more transactions of the status index are mapped against a data requester and an execution status. FIG. 2 depicts a status index 118 as per the exemplary embodiment.

The data requester 106, implemented via a first client device, is an entity that requires at least one data record to be processed using one or more data processing algorithms and the output from the processed data record to be passed on to the data requester 106. Similarly, the data provider 108, implemented via a second client device, is an entity that hosts a plurality of data records needed for processing, as required by the data requester 106. Optionally, the data processor, implemented via a third client device, is an entity that provides one or more data processing methods to the initial smart contract method 110 of the blockchain 102.

The term "client device" generally refers to a device executing an application, program, or process in a client/server relationship that requests information or services from another application, program, process or device (namely, a server) on a data communication network. Importantly, the terms "client" and "server" are relative, as an application may be a client to one application but a server to another application. Notably, the first and second client devices are configured to function as a "client" in a client/server relationship with the server arrangement. However, the first and second client devices may be configured to function as a "server" in a client/server relationship with other computing devices. Throughout the present disclosure, the terms "first client device", "second client device", and "third client device" refer to devices associated with a data provider, a data requester, and a data processor respectively that acts as clients to the data processing arrangement in a client/server relationship, wherein such devices can be personal devices or servers in local environments of the data provider data requester, and data processor respectively. The user interface is associated with each of the data processing arrangement of the respective client devices. In certain embodiments, the user interface forms a part of the data processing arrangement and are bundled together.

The first client device, the second device, and the third client device are operable, individually, to add a transaction to the blockchain 102 through a data processing arrangement and a user interface. The transaction may be added through a web-based application or mobile based application on a user interface 130 (not shown in FIG. 1) of the first client device and the second client device. In an alternate embodiment, third party extensions on the data processing arrangement allowing addition of the transaction to the blockchain are used.

Throughout this disclosure, the term "initial smart contract" refers to a preconfigured smart contract appended to a blockchain and includes a set of object definitions that are created automatically at the time of deployment of the preconfigured smart contract. The initial smart contract is an essential element for the blockchain communicably coupled to the data requester and the data provider. Any blockchain as per the disclosed system must be deployed said initial smart contract. The term "smart contract method" refers to set of codes which are used to interrogate a smart contract or change its state. A smart contract can have more than one smart contract methods within it, based on the desired output. Further, the term "standard method" refers to a default method call, from a smart contract, with pre-configured parameters unalterable by any user of blockchain and implement at least one defined function. Optionally, the standard methods can be implemented through one or more smart contract wrappers.

A CPU time/RAM or other resources needed to execute the smart contract methods can be acquired prior to addition of the initial smart contract. In some cases, it may be possible to add these resources on the fly. Moreover, the one or more standard methods can be re-configured/fine-tuned later by freezing the block containing the initial smart contract and updating the configurations of the one or more standard methods.

The term "data structure repository" refers to an organized collection of data elements stored inside the smart contract on a blockchain. These data elements can have different types and different lengths. The said data structure repositories can be either linear data structures or hierarchical. As a non-limiting example of such data structure repository, as used in one of the embodiments of the present disclosure, are linked lists and arrays with data elements being stored in the data structure repository in key-value pair format. Furthermore, the term "off-chain data storage medium" refers to any storage of data records which isn't stored on a blockchain. An example of such off-chain storage medium is Enigma, Swarm etc. The blockchain, in such cases, reads the data from third party solutions such as Oracle.

Throughout this disclosure the term "data processing arrangement" refers to an arrangement that includes one or more processors configured to perform various operations, for example, as mentioned earlier. Optionally, the data processing arrangement includes any arrangement of physical or virtual computational entities capable of performing the various operations. The term "one or more processors" may refer to one or more individual processors, processing devices and various elements associated with a processing device that may be shared by other processing devices. Additionally, the one or more individual processors, processing devices and elements are arranged in various architectures for responding to and processing the instructions that drive the aforesaid system.

Moreover, it will be appreciated that the data processing arrangement can be implemented by way of a single hardware server. The data processing arrangement can alternatively be implemented by way of a plurality of hardware servers operating in a parallel or distributed architecture. As an example, the data processing arrangement may include components such as a memory unit, a processor, a network adapter, and the like, to store and process information pertaining to the document and to communicate the processed information to other computing components, for example, such as a client device.

The data processing arrangement is communicably coupled via one or more communication networks 104 to the blockchain 102. The term "one or more communication networks" can be a collection of individual networks, interconnected with each other and functioning as a single large network. Such individual networks may be wired, wireless, or a combination thereof.

Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

Figure 3:
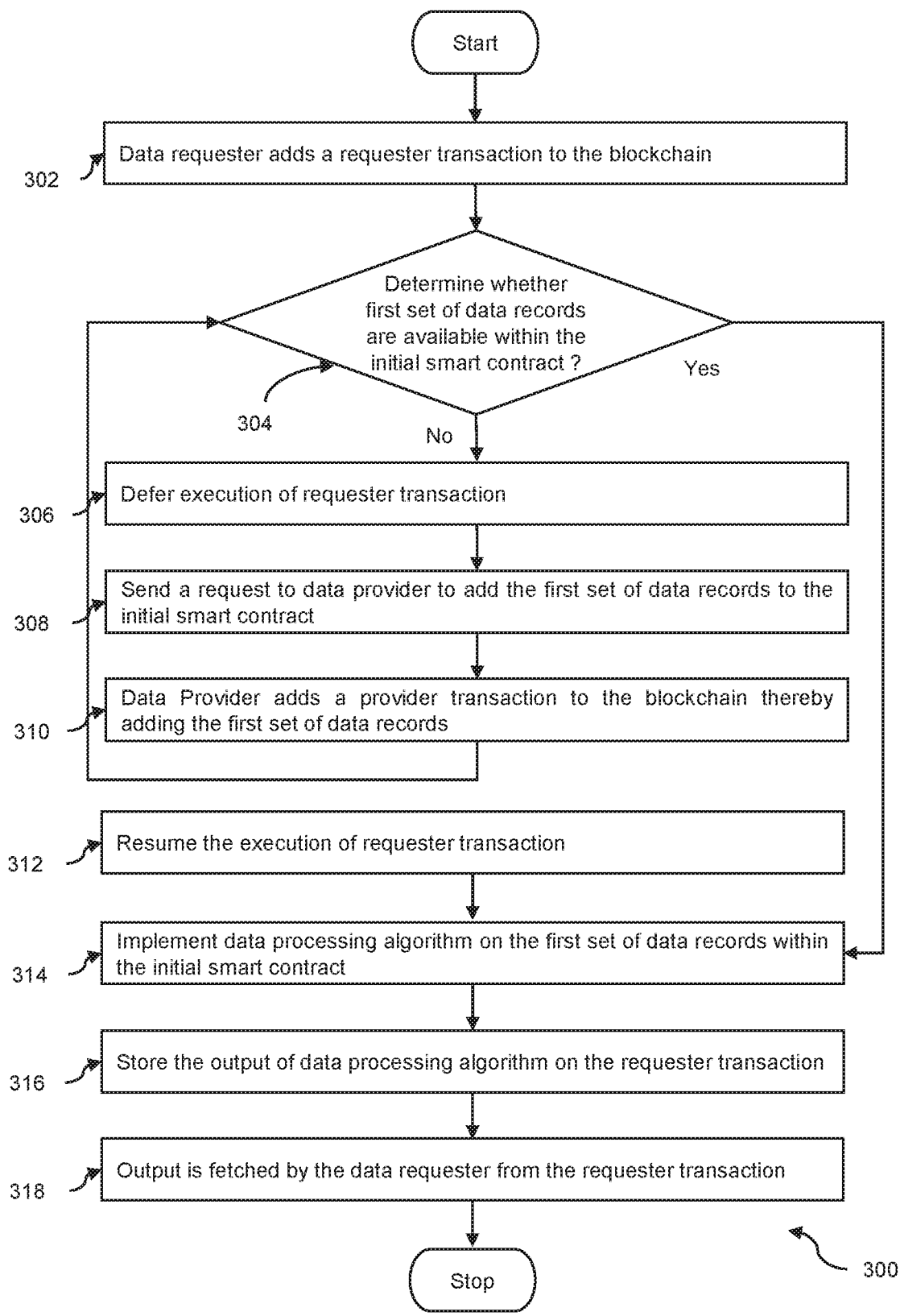
FIG. 3 depicts method steps in operation as per a preferred embodiment of the present disclosure.

In operation as per method steps 300, shown in FIG. 3, at step 302 the data requester 106 adds, through the first client device, a requester transaction 120 to the blockchain 102 wherein the requester transaction 120 comprises a method name, a document identifier, and one or more parameters. Further, the requester transaction 120 has preconfigured permissions to invoke one or more standard methods from the initial smart contract 110 of the blockchain 102. In an embodiment of the present invention, certain data records, hereinafter ("second set of data records"), that are required for processing, in addition to the first set of data records, is provided by the data requester 106 through the requester transaction 120 added to the blockchain 102. The second set of data records included within the requester transaction 120 are written onto the data structure repository 112 of the initial smart contract 110 of the blockchain 102. The one or more parameters associated with the requester transaction 120 are the required input parameters associated with a data processing method 114 corresponding to the method name included in the requester transaction 120. Optionally, the blockchain 102 maintains a method index wherein the method index is a mapping of method names to data processing methods. The initial smart contract can look-up the method index for the method name passed along with the requester transaction. The document identifier is used to identify a first set of data records on which the data processing method 114 is to be implemented. Optionally, the requester transaction 120 has preconfigured permissions to add an entry, corresponding to the requester transaction, to the status index 118. In an embodiment, the requester transaction 120 has further preconfigured permissions to invoke one of the standard methods, that when called, deletes the content, related to the first set of records and the second set of records, of the data structure repository 112.

Optionally, the requester transaction 120, added to the blockchain 102, invokes a standard method Check Method( ) within the initial smart contract 110 to verify whether the data processing method 114 corresponding to the method name is present on the blockchain 102.

Further, at step 304 the requester transaction 120, added to the blockchain 102, invokes a standard method IsPresent( ) within the initial smart contract 110 to verify whether the first set of data records, required for processing, is present within the data structure repository 112 of the initial smart contract 110 of the blockchain 102.

It shall be appreciated by persons skilled in the art that the standard method IsPresent( ) and CheckMethod( ) are just a nomenclature for the said standard method and are used for the purpose of describing the embodiment. In essence, a method, with any nomenclature, configured to monitor an availability of data records within a data structure repository of a smart contract on a blockchain shall suffice the purposes of IsPresent standard method. Similarly, a method, with any nomenclature, configured to check an availability of smart contract method on a blockchain shall suffice the purposes of CheckMethod( ) standard method.

Figure 4:
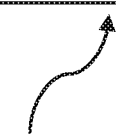
FIG. 4 depicts a status index in updated state as per a preferred embodiment of the present disclosure.

Based on a determination of unavailability of the first set of data records, the said standard method is operable to add a return identifier to the requester transaction 120 indicating that the first set of data records are not available. The requester transaction 120 is partially executed on the blockchain 102 and the return identifier is read by the data requester 106. Alternatively, optionally, the entry corresponding to the requester transaction 120 in the status index 118 is updated, with the return identifier, to indicate an unavailability of the first set of data records. FIG. 4 depicts the status index 118 in updated state. Optionally, an address of the entry in the status index 118 is returned to the partially executed requester transaction. The data requester 106 can retrieve information pertaining to the status of execution of the requester transaction 120 from the address of the entry corresponding to the requester transaction 120. The blockchain 102 exposes an API that can be read by the data requester 106 wherein the API can provide information from the status index 118 with respect to a particular transaction. The return identifier, as updated in the status index 118 against the requester transaction, is read by the data requester 106. Said API's endpoint comprises of blockchain name and smart contract name. Further, the API signature comprises of details of a particular transaction for which information is requested.

Responsive to the determination of unavailability of the first set of data records within the data structure repository 112 of the initial smart contract 110, the blockchain 102 is configured to defer, at step 306, further execution of the requester transaction 120. The entry corresponding to the requester transaction 120 is updated in the status index 118, thereby indicating a deferred execution status for the requester transaction 120. The standard method IsPresent ( ) is called, recursively, until the first set of data records are available on the blockchain 102. In an embodiment of the present invention, a predetermined time is set for availability of the first set of data records with the initial smart contract 110 on the blockchain 102. If the first set of data records are not available within the pre-determined time, the requester transaction 120 is fully executed and returns a null value and is subsequently tagged as a failed transaction. The predetermined time is based on a user-selected value provided by the data requester 106 and is passed along with the requester transaction 120.

Optionally, the initial smart contract 110 is configured to include a validation indicator 116 wherein the validation indicator 116 indicates an execution status of a transaction added to the blockchain 102. In an embodiment, the validation indicator 116 is implemented by means of a flag which is set in case of a successful execution of the transaction. In case of deferred execution, the flag is reset until the transaction is executed. The validation indicator 116 is used by the initial smart contract 110 to update the execution status of the transaction 120 in the status index 118 maintained in the data structure repository 112.

Similar to operation as described in the foregoing paragraphs, in case of unavailability of the data processing method 114 on the blockchain, the requester transaction 120 is partially executed and a response parameter is returned to the requester transaction 120 which is read by the data requester wherein the response parameter indicates unavailability of the data processing method 114 on the blockchain 102. Optionally, the unavailability of data processing method 114 is updated in the entry corresponding to the requester transaction 120 in the status index 118, and is subsequently read by the data requester 106. Further, unavailability of data processing method, as updated in the status index 118 against the entry corresponding to the requester transaction 120, is read through the API exposed by the blockchain 102. The data requester 106 sends another request to a data processor to add the data processing method 114 to the blockchain 102. The mode of request is similar to one described in the forthcoming paragraphs relating to request between data requester 106 and data provider 108.

The one or more data processors, responsive to the request by the data requester 106, adds the data processing method 114 to the initial smart contract 110 of the blockchain 102.

Throughout the present disclosure, a method name, smart contract name, a document identifier, a return identifier and a blockchain name is an alias used to refer a data processing method, a smart contract, set of data records, and a blockchain respectively. The alias could be any set of characters, numerical, alphanumeric codes, Hex codes or any nomenclature system capable of referring to and identifying a distinct entity. In an embodiment, the smart contract name may directly refer to the smart contract on a blockchain like in EOS blockchain. Optionally, alternatively, the smart contract name can be used to refer to an address of the smart contract on the blockchain, as in Ethereum blockchain. The terms return identifier and response identifier refers to a Boolean TRUE or FALSE that is returned based on fulfilment of a condition.

At step 308, the data requester 106, responsive to determination of unavailability of the first set of data records within the data structure repository 112 of the initial smart contract 110 on the blockchain 102, sends a request, through the one or more communication networks 104, to the one or more data providers 108 to provide the first set of data records, to the blockchain 102, for processing. The request contains specific parameters for qualifying the first set of data records required for processing, particulars of data records to be processed such as one or more attributes related to type of data structure, amount of data required, a technical domain or sub-domain, mandatory and optional data fields, or filter keywords for extracting relevant data records, blockchain name and the smart contract name where the first set of data records are required to be posted.

In an embodiment of the present invention, the request by data requester 106 to the data provider 108 is in form of triggering a SMTP based mail hosting on the data provider 108. Alternatively, the request is communicated by means of calling one or more APIs exposed by the Data Provider 108.

Responsive to the request by the data requester 106, at Step 310, the data provider(s) 108 adds a provider transaction 122 to the blockchain 102 wherein the provider transaction 122 comprises information pertaining to the first set of data records. In an embodiment of the present invention, information pertaining to the first set of data records comprises the first set of data records, that are to be processed. The provider transaction 122 has pre-configured permissions to invoke one or more standard method from the initial smart contract 110 of the blockchain 102 in order to write the first set of data records to the data structure repository 112 of the initial smart contract 110.

Throughout this disclosure, the term "structured manner" refers to an organised collection of data records with a defined schema. Structured data records enable machines to be able to understand and process information. Storing data records in a structured manner makes it easier to store, query and analyse data records.

Optionally, in an embodiment of the present invention, the first set of data records added by the data provider 108 is stored in a structured manner i.e. in form of tables in the data structure repository 112 of the initial smart contract 110 of the blockchain 102. The provider transaction 122, added to the blockchain 102 by the data provider 108, comprises preconfigured permissions to invoke a smart contract method in the initial smart contract 110 wherein the smart contract method is operable to create a database within the data structure repository 112 of the initial smart contract 110 within the blockchain 102. Further, the provider transaction 122 has preconfigured permissions to invoke another smart contract method to write the first set of data records into the database tables of the database created within the data structure repository 112 of the initial smart contract 110 of the blockchain 102. The provider transaction 122 further comprises of one or more user inputs, inputted by the data provider 108 via the second client device, wherein the one or more user inputs are required for the implementation of a database function element, corresponding to the invoked smart contract method, within the data structure repository 112 of the initial smart contract 110. Similarly, the provider transaction with several preconfigured permissions to invoke one or more smart contract methods in the initial smart contract may be added to the blockchain wherein each of said smart contract method, when invoked, implements at least one database function element. Optionally, the said smart contract methods configured to implement at least one database function element may be stored in a smart contract, separate from the initial smart contract 110, added to the blockchain 102. In such cases, the provider transaction shall have the address of the said smart contract and preconfigured permissions to invoke smart contract methods from the said smart contract on blockchain 102. Further, the said smart contract shall have permissions to access the data structure repository 112 of the initial smart contract 110 on the blockchain 102. Optionally, requester transaction added by the data requester 106 can also store the second set of data records in the data structure repository 112 of the initial smart contract 110 in structured fashion as described in the foregoing paragraphs. U.S. Provisional Patent Application No. 62/739,273 is referenced in this regard that discloses storing of data records in a structured manner on a blockchain and is incorporated herein in its entirety.

Throughout this disclosure, the term "database functional element" refers to one or more database functions that results in storing and managing the data records, in a structured manner, in the data structure repository. The database function element is one of data definition function, data manipulation function or data control function or, transaction control function, with same meaning and function as ascribed to them in respect of a standard SQL database. Non-limiting examples of the said database functional element are Create Table, Update Table, Insert Data, Alter Data, Drop Table etc. It will be appreciated that the database functional element inherently includes one or more data definition language commands and/or data query language command, thereby facilitating storing the data records in structured manner, and querying of data records from data structure repository of the main smart contract. Additionally, the said database functional element refers to parsing distinct values from unstructured data records.

The provider transaction 122 is successfully executed once the first set of data records are added to the data structure repository 112 of the initial smart contract 110. Responsive to the successful execution of the provider transaction 122, the validation indicator 116 is reset, indicating availability of the first set of data records within the data structure repository 112 of the initial smart contract 110. Subsequently, the entry corresponding to the requester transaction 120 in the status index 118 is updated.

It shall be appreciated by the person skilled in the art that similar to the process described in the foregoing paragraphs, more than one data providers, when requested by the data requester 106, may provide their data records to the blockchain 102 for processing by means of adding multiple provider transactions to the blockchain 102.

Based on the successful execution of the provider transaction 122, as indicated by the validation indicator 116, the requester transaction 120 is resumed, from the deferred state, at Step 312 and the data processing method 114 corresponding to the method name included in the requester transaction 120 is implemented on the first set of data records at step 314.

The output of data processing method 114 implemented on the first set of data records within the data structure repository 112 of the initial smart contract 110 is written to the requester transaction 120, and is finally transmitted to the data requester 106 in form of the data requester 106 fetching the output from the requester transaction. Optionally, the output is written, at Step 316, into a memory location of the data structure repository 112 of the initial smart contract 110 of the blockchain 102 and an address pertaining to the said memory location within the data structure repository is updated against the entry corresponding to the requester transaction in the status index 118. The said memory location is written to the requester transaction, which is fetched by the data requester 106. The output may be fetched, subsequently at Step 318, by adding a transaction with preconfigured permissions to access the memory location in the data structure repository 112, the said memory location being passed along with the transaction. Alternatively, the output may be fetched using the API exposed by the blockchain 102. In an embodiment of the present invention, the output pertaining to the requester transaction 120 is stored in a structured manner in the memory location within the data structure repository 112 of the initial smart contract 110 of the blockchain 102. One or more user inputs required for storing the output in structured manner is passed along with the requester transaction 120.

Alternatively, optionally, an output may be stored in one of the columns of the status index 118 against entry corresponding to the requester transaction 120. Optionally, alternatively, the output may be returned to the requester transaction 120.

In another embodiment of the present invention, the data provider 108 stores the first set of data records on a distributed file system such as IPFS and provides, through the provider transaction, a hash of the storage location on the IPFS. The provider transaction 122 added by the data provider 108 has preconfigured permissions to invoke standard method "Read from IPFS" within the initial smart contract 110 by passing the address hash of the storage location on the IPFS. The "Read from IPFS" standard method of the initial smart contract 110 of the blockchain 102 reads the first set of data records available at the IPFS as per the provided hash. The first set of data records are returned by the "Read from IPFS" standard method and the same is stored in the data structure repository 112 of the initial smart contract 110 of the blockchain 102. It shall be appreciated that any distributed file system storage would perform in similar manner as IPFS for the purposes of present invention. Optionally, the first set of data records can be stored, once the same is fetched by "Read from IPFS" standard method, in a structured manner within the data structure repository 112 of the initial smart contract 110 by employing the method as disclosed in the foregoing paragraphs corresponding to storing data records in a structured manner in the data structure repository 112. The provider transaction 122 comprises, in addition to preconfigured permissions to invoke "Read From IPFS" standard method, one or more user inputs for the implementation of a database function element within the data structure repository 112 of the initial smart contract 110.

Optionally, the output of the data processing method 114 implemented on the first set of data records are written on to IPFS using the standard method "Write to IPFS" present within the initial smart contract 110. The "Write to IPFS" standard method writes the output to a second storage location in IPFS and return a second hash for the second storage location in IPFS. The second hash is stored in the data structure repository 112 of the initial smart contract 110 of the blockchain 102. The second hash is written to the requester transaction 120 which is received by the data requester 106. The data requester 106, can then fetch the output from the second storage location of the IPFS using the second address hash. Optionally, the second hash is included in the entry, corresponding to the requester transaction 120, of the status index 118.

It shall be appreciated that the one or more data processors 124 may add a new smart contract with the data processing method 114 to the blockchain 102 rather than appending a new smart contract method to the initial smart contract 110 of the blockchain 102. In an embodiment, the data requester 106 can communicate, using the first client device, with the one or more data processors to identify the smart contract name and address where the data processing method 114 has been added by the one or more data processors 124. The data requester 106 can then pass, to the blockchain 102, the smart contract name and address along with the requester transaction 120. The initial smart contract 110 can refer to the smart contract, as identified by the requester transaction 120, for implementing the data processing method 114 on the first set of data records.

As per an example embodiment, a data requester 106 requires a document classification ("data processing algorithm") to be done on a corpus of documents i.e. "first set of data records" to determine the number of documents related with a biomedical entity EGFR and authored by one Mr. Rahul Sharma ("Output"). The data requester 106 has a developed biomedical ontology comprising over 1.6 million entities i.e. the "second set of data records". However, the data requester 106 doesn't have the first set of data records on which the data processing method 114 is to be implemented in order to derive the Output. The data provider 108 is an entity that controls the first set of data records as required by the data requester 106. The data processing algorithm 606 is added by a data processor 124 to the initial smart contract 110 of the blockchain 102 in form of a smart contract method which, when called, implements the data processing method classify.documents( ) on the first set of data records.

Figure 5:
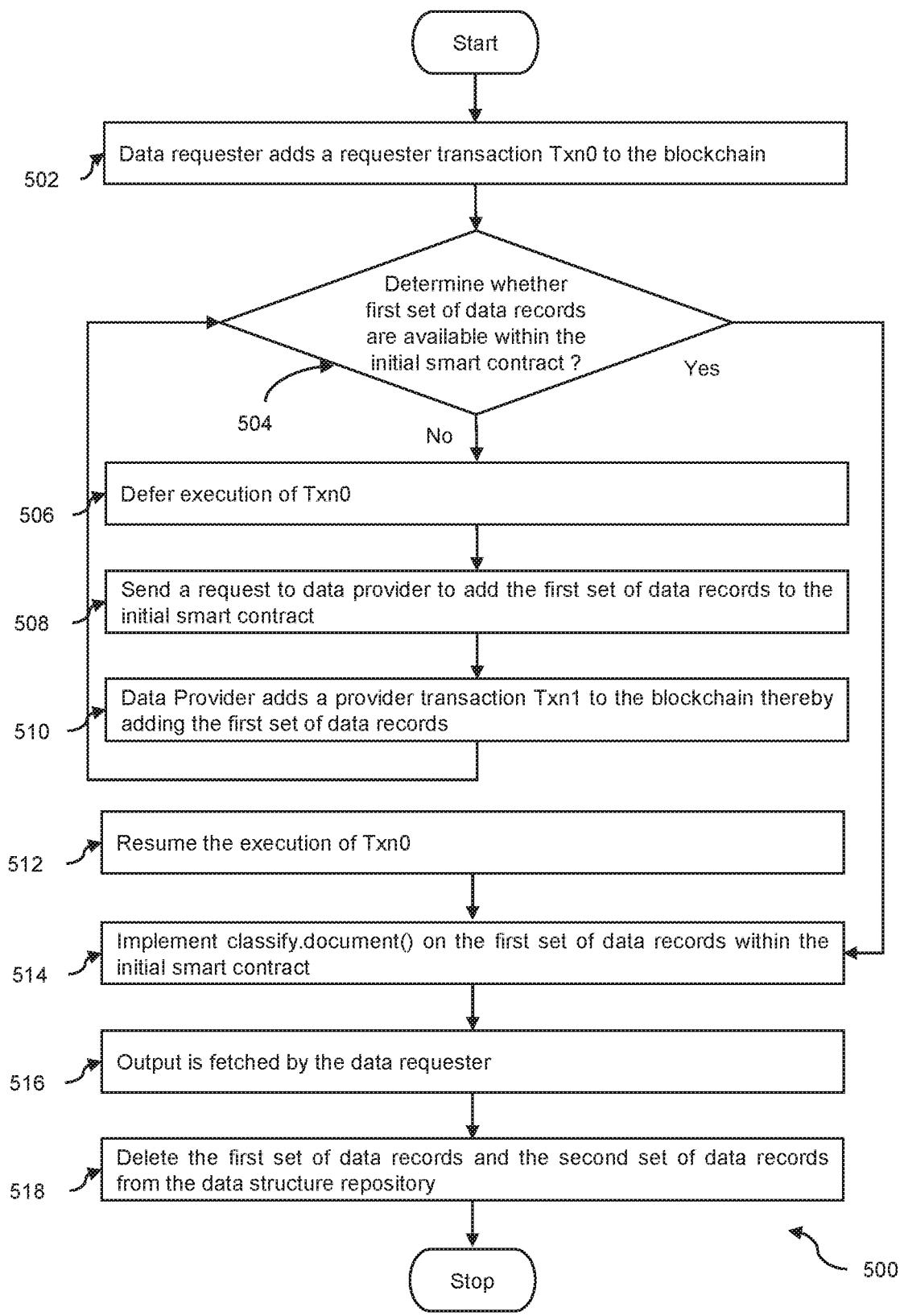
FIG. 5 depicts a flowchart of the claimed method in operation as per an example embodiment.

FIG. 5 depicts a flowchart of the claimed method 500 in operation. At step 502, the data requester 106, using the first client device, adds a requester transaction Txn0 120 to the blockchain 102 wherein Txn0 comprises the data processing method name i.e. classify.documents( ) a document identifier for first set of data records and two parameters ("EGFR", "Rahul Sharma"). Further, Txn0 comprises the second set of data records i.e. the ontology terms. Preferably, the ontology terms are entered in a key value pair format. As an example record, the following can be looked into: Entity1: EGFR; Entity2: PLD3. It shall be appreciated that owing to size limitations of a transaction for a given blockchain, the data addition through transaction may be accomplished through one or more transactions. Txn0 has preconfigured permissions to invoke standard method "Write Data" to the data structure repository of the initial smart contract 110. At step 504, Txn0 further invokes a standard method IsPresent ( ) from the initial smart contract 110 to determine whether the first set of data records, identified from the document identifier of Txn0, are present on the data structure repository 112 of the blockchain 102.

Based on the determination of unavailability of first set of data records on the data structure repository 112 of the initial smart contract 110 of the blockchain 102, at step 506, further execution of Txn0 is deferred. A validation indicator 116 within the initial smart contract 110 is set to FALSE.

Responsive to the foregoing operation, at step 506, and based on determination that the first set of data records are not available within the data structure repository 112 of the initial smart contract 110, the data requester 106 sends a request to a data provider 108 to upload the first set of data records to the blockchain 102.

At step 510, the data provider 108 adds a provider transaction Txn1 122 to the blockchain 102 wherein Txn1 comprises the first set of data records. Txn1 has preconfigured permissions to invoke "Write Data" standard method which writes the first set of data records to the data structure repository 112 of the initial smart contract 110 of the blockchain 102. Once the writing operation is completed, the provider transactionTxn1 is successfully executed and the validation indicator 116 is reset to TRUE.

At step 512, the execution of transaction Txn0 is resumed and at step 514, the data processing method classify.document( ) is implemented on the first set of data records and the second set of data records to generate an Output 231110 i.e. 231110 data records out of the first set of data records are related to EGFR and Rahul Sharma as author. Optionally, the output contains each of the 231110 documents identified by the data processing method 114. At 516, the Output is fetched by the data requester 106. At 518, Txn0 invokes another standard method Delete ( ) which deletes the first set of data records, and the second set of data records from the data structure repository 112 of the initial smart contract 110. The transaction txn0 is finally successfully executed.

In another embodiment of the present invention, the output pertaining to the requester transaction 120 is displayed on the user interface associated with the data requester 106. Additional transactions may be added, via the user interface 108, to the blockchain 102 in order to deep dive into the results of the data processing algorithm implemented on the first set of data records.

Alternatively, in another embodiment, the data requester 106 adds a transaction to the blockchain 102, wherein the transaction comprises information pertaining to partial processing on a set of data records. A first processing step is performed on the data requester 106, and then the partially processed data records are added to the blockchain via the transaction for further processing by one or more data processing methods. Therefore, the blockchain 102 is configured to operate in a server-client architecture for processing of data records. In an example embodiment, a similarity computation is done between a given document and one or more documents available in public domain wherein the given document is processed on the first client device associated with the data requester 106. One or more feature vectors from the processed document is added, by means of a transaction, to the blockchain. The data provider 108 provides one or more documents against which the similarity computation is to be performed. Alternatively, the one or more documents available in the public domain may be pre-processed and feature vectors of the said one or more documents may be added to the blockchain 102 by means of another transaction.

It shall be appreciated by person skilled in the art that the terms "requester transaction" and "provider transaction" are used for naming purposes for better clarity and understanding of the disclosed invention and refer to a transaction added by the data requester 106 and data provider 108, respectively. In substance, the requester transaction and provider transaction are ascribed the same meaning as is prevalent in the industry in context of a transaction added to the blockchain. As such, the requester transaction and the provider transaction are Any examples or illustrations given herein are not to be regarded in any way as restrictions on, limits to, or express definitions of, any term or terms with which they are utilized. Instead, these examples or illustrations are to be regarded as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

The description, embodiments and figures are not to be taken as limiting the scope of the claims. It should also be understood that throughout this disclosure, unless logically required to be otherwise, where a process or method is shown or described, the steps of the method may be performed in any order, repetitively, iteratively or simultaneously. At least portions of the functionalities or processes described herein can be implemented in suitable computer-executable instructions.

It will be appreciated that features of the present disclosure are susceptible to being combined in various combinations and additional features may be introduced without departing from the scope of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method for secure data processing on a blockchain communicatively coupled to a data requester and a data provider, the method comprising:
   receiving, from the data requester, at least one requester transaction with one or more preconfigured permissions, wherein the requester transaction comprises a method name, and one or more parameters;
   determining an unavailability of a first set of data records on the blockchain;
   deferring, based on the determination of the unavailability of the first set of data records on the blockchain, an execution of the at least one requester transaction;
   receiving, from a data provider, at least one provider transaction on the blockchain, wherein the provider transaction comprises information pertaining to the first set of data records;
   resuming, subsequent to an execution of the at least one provider transaction, the execution of the at least one requester transaction;
   implementing a data processing method corresponding to the method name on the first set of data records on the blockchain, wherein the data processing method is a smart contract method that, when invoked, implements at least one data processing algorithm on one or more data records within a data structure repository of an initial smart contract; and
   transmitting an output to the data requester, wherein the output is derived out of the implementation of the data processing method on the first set of data records.

2. The method of claim 1 wherein the blockchain comprises the initial smart contract, the initial smart contract further comprising a plurality of data processing methods for implementing one or more data processing algorithms on data records in the data structure repository within the initial smart contract.

3. The method of claim 2 wherein the data processing method implemented on the first set of data records is one of the plurality of data processing methods within the initial smart contract.

4. The method of claim 2, wherein the initial smart contract further comprises one or more standard methods corresponding to a database function element.

5. The method of claim 4 wherein the database function element is one of data definition, data manipulation or data control or, transaction control function, as implemented in a standard SQL database.

6. The method of claim 1 wherein the blockchain is further configured to accept the data processing method from a data processor in response to a determination of an unavailability of the data processing method on the blockchain.

7. The method of claim 1 wherein the data requester is further configured to send a request to the data provider based on the determination of the unavailability of the first set of data record on the blockchain.

8. The method of claim 1, wherein the received at least one provider transaction comprises the first set of data records.

9. The method of claim 1, wherein the blockchain is communicatively coupled to a distributed file storage system.

10. The method of claim 9, wherein the received at least one provider transaction comprises a hash address wherein the hash address is indicative of a first storage location on the distributed file storage system, the first storage location configured to store the first set of data records.

11. A secure data processing system comprising:
a data requester;
a data provider;
a blockchain communicatively coupled to the data requester and the data provider, the secure data processing system further comprising at least one computer processor, wherein the at least one computer processor is configured to cause the blockchain to:
receive, from the data requester, at least one requester transaction with one or more preconfigured permissions wherein the requester transaction comprises a method name, and one or more parameters;
determine an unavailability of a first set of data records on the blockchain;
defer, based on the determination of the unavailability of the first set of data records on the blockchain, an execution of the at least one requester transaction;
receive, from a data provider, at least one provider transaction on the blockchain, wherein the provider transaction comprises information pertaining to the first set of data records;
resume, subsequent to execution of the at least one provider transaction, the execution of the at least one requester transaction;
implement a data processing method corresponding to the method name on the first set of data records, wherein the data processing method is a smart contract method that, when invoked, implements at least one data processing algorithm on one or more data records within a data structure repository of an initial smart contract; and
transmit an output to the data requester, wherein the output is derived out of the implementation of the data processing method on the first set of data records.

12. The system of claim 11 wherein the blockchain comprises the initial smart contract, the initial smart contract further comprising a plurality of data processing methods for implementing one or more data processing algorithms on data records in the data structure repository within the initial smart contract.

13. The system of claim 12 wherein the implemented data processing method is one of the plurality of data processing methods within the initial smart contract.

14. The system of claim 12, wherein the initial smart contract further comprises one or more standard methods corresponding to a database function element.

15. The system of claim 14, wherein the database function element is one of data definition, data manipulation or data control or, transaction control function, as implemented in a standard SQL database.

16. The system of claim 11 wherein the blockchain is further configured to accept the data processing method from a data processor in response to a determination of an unavailability of the data processing method on the blockchain.

17. The system of claim 11 wherein the data requester is further configured to send a request to the data provider based on the determination of the unavailability of the first set of data records on the blockchain.

18. The system of claim 11, wherein the received at least one provider transaction comprises the first set of data records.

19. The system of claim 11, wherein the blockchain is communicatively coupled to a distributed file storage system.

20. The system of claim 11, wherein the received at least one provider transaction comprises a hash address wherein the hash address is indicative of a first storage location on the distributed file storage system, the first storage location configured to store the first set of data records.

* * * * *